United States Patent Office 3,557,050
Patented Jan. 19, 1971

3,557,050
STABILIZED VINYL FLUORIDE POLYMERS
Shun Koizumi, Osaka-shi, and Keizo Inamura, Hiratsuka-shi, Japan, assignors to Daikin Kogyo Kabushiki Kaisha, Osaka-shi, Japan, and Kansai Paint Company Limited, Hyogo-ken, Japan, both juridical Persons of Japan
No Drawing. Filed Mar. 5, 1968, Ser. No. 710,646
Claims priority, application Japan, Mar. 8, 1967, 42/14,842
Int. Cl. C08f 45/58, 45/60, 45/62
U.S. Cl. 260—45.8                           9 Claims

ABSTRACT OF THE DISCLOSURE

A heat-stable composition comprising a vinyl fluoride polymer, 0.01 to 5 weight percent of an alkali metal formate, based on the weight of the vinyl fluoride polymer and 0.01 to 5 weight percent of an organic antioxidant having a boiling point of higher than the melting point of the vinyl fluoride polymer, based on the weight of the vinyl fluoride polymer.

This invention relates to stabilized vinyl fluoride polymers and particularly to compositions containing polyvinyl fluoride of improved heat stability.

Vinyl fluoride polymers, such as polyvinyl fluoride, have excellent properties suitable for films, laminates, mouldings etc. For example, hardness, impact strength, chemical resistance and weather resistance are all well for such purposes. However, the thermal stability thereof in the vicinity of its melting point is relatively poor. In fact when polyvinyl fluoride is heated at its melting point the polymer discolors and degrades rapidly. Lack of thermal stability makes it difficult to subject the vinyl fluoride polymers to melt extrusion techniques and laminating procedures commonly performed at elevated temperatures as well as to produce white or light colored products.

In general polymeric vinyl chlorides are also poor in thermal stability and are subject to discoloration and degradation under the influence of heat. Therefore, various stabilizers to prevent such discoloration and degradation have been proposed. However, many of such known stabilizers effective for the polymeric vinyl chlorides or olefins are not so effective in the case of vinyl fluoride polymers.

There has been proposed to use alkali metal formate as a stabilizer for polyvinyl fluoride. By the addition of such compound the thermal stability of polyvinyl fluoride may be improved in some degree, but the effect is not sufficient and the polymer is still subject to discoloration and degradation when heated at its melting point.

It is an object of the invention accordingly to provide new and useful compositions containing vinyl fluoride polymers of improved thermal stability.

Further object of the invention is to provide polyvinyl fluoride compositions capable of moulding or laminating at elevated temperatures, particularly in the vicinity of the melting point of the polymer, to produce self-supporting films, mouldings, laminates, etc., free from undesired discoloration and degradation.

According to researches of the present inventors, it has been found that when alkali metal formate is used in a specific amount in combination with the stabilizers for polyvinyl chlorides or polyolefins which have been considered almost ineffective in the case of polyvinyl fluoride, synergistic effect can be displayed and thermal stability of vinyl fluoride polymers is markedly improved.

This invention is based on the above discovery, and a composition of the invention comprises a vinyl fluoride polymer, 0.01 to 5 weight percent of alkali metal formate, based on the weight of the vinyl fluoride polymer and 0.01 to 5 weight percent of organic antioxidant having a boiling point of higher than the melting point of the vinyl fluoride polymer, based on the weight of the vinyl fluoride polymer.

The vinyl fluoride polymers used in the invention include a homopolymer of vinyl fluoride and a copolymer of at least 75 weight percent of vinyl fluoride and at the most 25 weight percent of other copolymerizable monomers. In general, these vinyl fluoride polymers have a melting point of 190 to 230° C. The copolymerizable monomers are (1) ethylene series hydrocarbons such as ethylene, propylene, isobutylene, styrene, etc.; (2) haloethylene series hydrocarbons such as vinyl chloride, vinyl bromide, vinylidene chloride, vinylidene fluoride, 1,1-difluoro - 2 - chloroethylene, trifluorochloroethylene, tetrafluoroethylene, 1,1,1-trifluoropropylene, hexafluoropropylene, etc.; (3) vinyl esters such as vinyl formate, vinyl acetate, vinyl propionate, vinyl butylate, vinyl pivalate, vinyl benzoate, vinyl stearate, vinyl sulfonate, vinyl phosphate, etc.; (4) vinyl ethers such as vinyl ethyl ether, tetrafluoroethylallyl ether, vinyl dioxolane, etc.; (5) acrylic acid and methacrylic acid, and derivatives thereof such as esters, nitriles, amides, anhydrides, halides, etc.; (6) maleic acid, phmalic acid and derivatives thereof such as dimethyl maleate, dimethyl phmalate, maleic anhydride, etc.; (7) vinyl ketones such as methyl vinyl ketone, etc.; (8) vinyl imides such as N-vinyl phthalimide, N-vinyl saccineimide, etc.; and (9) propenyl esters such as allyl acetate, isopropenyl acetate, etc.

The alkali metal formate used in the invention is desirably sodium formate, potassium formate, and lithium formate, and may be used alone or in mixture.

In this invention it is necessary to use the organic antioxidant in combination with the alkali metal formate. Such antioxidants are known in the art as a stabilizer for the polymeric vinyl chlorides or olefins. The antioxidants used in the invention should have a boiling point of higher than the melting point of the vinyl fluoride polymer used. If an antioxidant of lower boiling point is used, it evaporates off by heat applied to mould or laminate the composition. The antioxidants used include phenol-based antioxidants, amine-based antioxidants, triazine-based antioxidants, imidazol-based antioxidants, thiodicarboxylic acid esters, and others. Examples of the antioxidants are (1) phenol-based antioxidants: 4,4'-dihydroxybiphenyl, dihydroxydiphenylmethane derivatives, hydroquinonemonobenzyl ether, 1,1-bis-(4-hydroxyphenyl)-cyclohexane, 1-oxy-3-methyl-4-isopropyl benzene, 2,4,5-trihydroxybutyrophenone, 2,4-dimethyl-6-tertiarybutylphenol, 2,6-ditertiarybutylphenol, 2,5-ditertiaryamylhydroquinone, 2,5-ditertiarybutylhydroquinone, 2,6-ditertiarybutyl-p-cresol, 4-hydroxymethyl-2,6-ditertiarybutylphenol, 4,4'-bis-(2,6-ditertiarybutylphenol), 2,6-ditertiarybutyl-α-dimethylamino-p-cresol, 2,2' - methylene - bis - (4-methyl-6-tertiarybutylphenol), 2,2'-methylene-bis-(4-ethyl - 6 - tertiarylbutylphenol), 4,4'-methylene-bis-(6-tertiarybutyl-o-cresol), 4, 4' - methylene-bis-(2,6-ditertiarybutylphenol), 6-tertiarybutyl-methylphenol derivatives, 1,3,5-trimethyl-2,4,6-tris-(3,5 - ditertiarybutyl-4-hydroxybenzene), 4,4'-butylidene-bis-(3-methyl-6-tertiarybutylphenol), 4,4'-thio-bis-(6-tertiarybutyl - 3-methylphenol), bis-(3-methyl-4-hydroxy-5-tertiarybutylbenzylsulfide), 4,4'-thio-bis-(6-tertiarybutyl-o-cresol), 4,4' - thio-bis-(3-methyl-6-tertiarybutylphenol), 2,2' - thio-bis-(4-methyl-6-tertiarybutylphenol), thio-bis-(disecondaryamylphenol), 2,2' - dihydroxy - 3,3' - di-(α-methylcyclohexyl) - 5,5'-dimethyldiphenylmethane, styrenated phenol, dialkyl-phenolsulfide, hindered phenols, high molecular weight phenol compounds, etc., (2) amine-based antioxidants: phenyl-α-naphthylamine, phenyl-β-naphthylamine, N,N'-diphenyl-p-phenylenediamine, N,N'-di-β-naphthyl-p-phenylenediamine, N,N'-diallyl-p-phenylenediamine, N - isopropyl-N'-phenyl-p-phenylenediamine, 2,2,4-trimethyl-1,2-dihydroquinoline polymers, 6-ethoxy-2,2,4-trimethyl-1,2-dihydroquinoline, condensation product of diphenyl amine and acetone, condensation product of phenyl-$\beta$-naphthylamine and acetone, aldol-$\alpha$-naphthylamine, etc., (3) triazine-based antioxidants: triazine derivatives e.g. 2,4-bis-(n-octylthio)-6-(4-hydroxy-3,5-di-t-butyl anilino)-1,3,5-triazine, sold under the trademark "Irganox 565," and 4-n-octylthio-2,6-bis-(4-hydroxy-3,5-di-t-butyl anilino)-1,3,5-triazine sold under the trademark "Irganox 858" (Geigy Chemical Corp., Switzerland), etc., (4) imidazole-based antioxidants: 2-mercaptobenzoimidazole, zinc salt of 2-mercaptobenzoimidazole, etc., (5) thoidicarboxylic acid esters having the formula of $$S(C_nH_{2n}COOR)_2$$

wherein R is alkyl or alkylene of 6 to 20 carbon atoms and $n$ is an integer of 1 to 4: distearyl thiodipropionate, dilauryl thiodipropionate, etc., (6) others: reaction product of morpholinium-N-oxydiethylene-dithiocarbamate and dibenzothiazyldisulfide, reaction product of 1,1-bis-(4-hydroxyphenol)-cyclohexane and organic amines, tri-(nonylphenyl)-phosphite, hydrazine derivatives, mixtures of aromatic hydrazines and hydroquinone derivatives, etc.

In order to secure the synergistic effect of said alkali metal formate and organic antioxidant, both compounds should be mixed with the vinyl fluoride polymers in a specific range of amounts. Namely, the alkali metal formate is mixed in the range of 0.01 to 5 weight percent, preferably 0.1 to 3 weight percent, based on the weight of the vinyl fluoride polymer, and the antioxidant is mixed in the range of 0.01 to 5 weight percent, preferably 0.1 to 3 weight percent, based on the weight of the vinyl fluoride polymer. When the amount of one of both compounds is less than the above, synergistic effect cannot be displayed and thermal stability of the vinyl fluoride polymers is not improved sufficiently. The use of larger amount is not only uneconomical but also reduces the effect of preventing discoloration of the vinyl fluoride polymers.

The composition of the invention may be preferably used as moulding or coating compositions. To prepare the moulding compositions, for example, the alkali metal formates and antioxidants are added in a form of powder to the particulate vinyl fluoride polymers and milled by the conventional means to disperse the formates and antioxidants homogeneously into the polymers. The coating compositions are prepared, for example, by mixing organic solvent solution or aqueous dispersion of vinyl fluoride polymer with the formates and antioxidants.

The solvents used in preparing the coating compositions are dimethyl acetoamide, diethyl formamide, $\gamma$-butyrolactone and the like organic solvents for vinyl fluoride polymers. The amount of the solvents may vary over a wide range in accordance with the kinds of the coating compositions, but usually used in the range of 100 to 500 weight parts, based on 100 weight parts of the vinyl fluoride polymers.

The composition may contain various additives, such as resins other than vinyl fluoride polymers (e.g., butylal resin and the like resins having compatibility with the vinyl fluoride polymers), plasticizers (e.g., dicyclohexyl phthalate, diisodecyl phthalate), pigments, etc.

For fuller understanding of the invention examples are given below, in which all "parts" are shown by weight:

EXAMPLE 1

To 100 parts of polyvinyl fluoride having 1.10 intrinsic viscosity measured in $\gamma$-butyrolactone at 100° C. were added various amounts specified in Table 1 below of sodium formate and 4,4'-butylidene-bis-(3-methyl-6-tertiarybutylphenol) and 10 parts of titan white, and milled with a pebble mill for 48 hours, whereby homogeneous polyvinyl fluoride composition was obtained.

1 gram of said composition was pressed into a disk of 3 cm. in diameter, then hot-pressed between ferro-type plate at 250° C. under a load of 500 kg./cm.$^2$ for 8 minutes, and cooled with water to obtain white film of 100 microns in thickness.

The degree of yellowing of each film thus obtained was measured by using Gardner's multipurpose reflector. In the measurement the light passing through green filter was irradiated over the tested film and its reflection was measured with photoelectric cell by G value, and the lights passing through amber and blue filters respectively were recorded as A and B values, as calculated for the degree of yellowing by the following formula:

$$\text{Degree of yellowing} = \frac{A-B}{G}$$

The results are shown in Table 1 below; in which amounts in percent of sodium formate and antioxidant are weight percent based on the weight of polyvinyl fluoride.

TABLE 1

| Amount of HCOONa (percent) | Amount of antioxidant (percent) | | | | | | |
|---|---|---|---|---|---|---|---|
| | 0 | 0.001 | 0.01 | 0.1 | 1 | 5 | 10 |
| 0 | 0.896 | 0.742 | 0.546 | 0.346 | 0.179 | 0.153 | 0.163 |
| 0.001 | 0.789 | 0.654 | 0.388 | 0.205 | 0.103 | 0.112 | 0.125 |
| 0.01 | 0.642 | 0.541 | 0.068 | 0.052 | 0.045 | 0.051 | 0.095 |
| 0.1 | 0.596 | 0.526 | 0.061 | 0.043 | 0.301 | 0.042 | 0.091 |
| 1 | 0.531 | 0.397 | 0.051 | 0.036 | 0.017 | 0.021 | 0.092 |
| 5 | 0.431 | 0.356 | 0.048 | 0.028 | 0.017 | 0.020 | 0.093 |
| 10 | 0.385 | 0.321 | 0.091 | 0.094 | 0.099 | 0.092 | 0.095 |

From the above table, it is evident that by mixing alkali metal formate and antioxidant in a proportion of 0.01 to 5 weight percent respectively on the basis of the weight of polyvinyl fluoride, to form a film, the degree of yellowing of the film is markedly reduced by synergistic action of both substances. And when the degree of yellowing is in such low ranges, the discoloration of the product is unperceivable by the naked eye, but when it exceeds 0.2, evident discoloration is observed by the naked eye, and commercial value of the product is substantially reduced.

EXAMPLE 2

To 100 parts of polyvinyl fluoride having 0.82 of intrinsic viscosity measured in $\gamma$-butyrolactone at 100° C. and 0.41 micron of average particle size were added 0.5 part of potassium formate, 0.5 part of lithium formate, 0.1 part of 4,4'-thiobis-(3-methyl-6-tertiarybutylphenol), 0.1 part of N,N'-di-$\beta$-naphthyl-p-phenylenediamine, 400 parts of dimethylacetoamide and 50 parts of titan white, and the mixture was milled with a pebble mill for 48 hours, whereby homogeneous white coating composition was obtained.

A steel plate of 1 mm. in thickness was coated 100 microns thick with the composition thus obtained, then dried in an air oven at 250° C. for 7 minutes, and the dried film was stripped off from the plate to obtain polyvinyl fluoride film of 25 microns thickness.

For comparison, two kinds of films (film A and film

B) were prepared by the same manner as in Example 2 by using the following compositions:

Composition for film A.—Composition prepared by the same manner as in Example 1 except that potassium formate and lithium formate were not used.

Composition for film B.—Composition prepared by the same manner as in Example 1 except that 4,4'-thiobis-(3-methyl-6-tertiarybutylphenol) and N,N'-di-β-naphthyl-p-phenylenediamine were not used.

The degree of yellowing of the film of Example 2, film A and film B was measured in the manner as described in Example 1 with the results shown in Table 2 below.

TABLE 2

| Film tested: | Degree of yellowing |
|---|---|
| Film of Example 2 | 0.012 |
| Comparison— | |
| Film A | 0.343 |
| Film B | 0.428 |

EXAMPLE 3

In a stainless steel autoclave were placed 1,000 parts of water, 276 parts of vinyl fluoride, 164 parts of vinylidene fluoride and 2 parts of α,α'-azobis-isobutyroamidine hydrochloric acid salt, and heated at 80° C. for 3 hours, producing a copolymer of vinyl fluoride and vinylidene fluoride. The copolymer was confirmed to comprise 95 mole percent of vinyl fluoride and 5 mole percent of vinylidene fluoride by elementary analysis. The intrinsic viscosity measured in γ-butyrolactone at 100° C. was 0.67 and average particle size was 0.26 micron.

With the copolymer thus obtained were thoroughly mixed 1 part of sodium formate, 0.5 part of 4,4'-butylidene-bis-(3-methyl-6-tertiary-butylphenol), and the mixture was pressed at 250° C. for 25 minutes to produce sheet, 70 mm. diameter and 3 mm. thick.

For comparison, two kinds of sheets (sheet A and sheet B) were prepared from the following compositions:

Composition for sheet A.—Composition prepared by the same manner as in Example 3 except that the antioxidant was not used.

Composition for sheet B.—Composition prepared by the same manner as in Example 3 except that sodium formate was not used.

The degree of yellowing of the sheet of Example 3, sheet A and sheet B was measured in the manner as described in Example 1 with the results shown in Table 3 below.

TABLE 3

| Sheet tested: | Degree of yellowing |
|---|---|
| Sheet of Example 3 | 0.024 |
| Comparison: | |
| Sheet A | 0.561 |
| Sheet B | 0.725 |

EXAMPLE 4

To 1 gram of polyvinyl fluoride having 1.10 of intrinsic viscosity measured in γ-butyrolactone at 100° C. and 0.4 micron of average particle size were added the amount specified in Table 4 below of sodium formate, 3 grams of dimethylphthalate and 5 mg. of antioxidant specified in Table 4 and the mixture was thoroughly milled, whereby white polyvinyl fluoride composition was obtained.

From each composition films were prepared by the same manner as in Example 1 and the degree of yellowing was measured by the same manner as in Example 1 with the results shown in Table 4 below, and for comparison the degree of yellowing of each film prepared by the same manner as above from the same composition except that no sodium formate was contained therein was also shown in the table:

TABLE 4.—DEGREE OF YELLOWING

| Antioxidants | Sodium formate 0 g. | 5 mg. |
|---|---|---|
| 1. Phenol-based antioxidants | | |
| 1,1-bis-(4-hydroxyphenyl)-cyclohexane | 0.687 | 0.020 |
| 2,4-dimethyl-6-tertiarybutylphenol | 0.716 | 0.032 |
| 2,6-ditertiarybutyl-p-cresol | 0.623 | 0.046 |
| 2,2'-methylene-bis-(4-methyl-6-tertiarybutylphenol) | 0.549 | 0.021 |
| 4,4'-butylidene-bis-(3-methyl-6-tertiarybutylphenol) | 0.498 | 0.019 |
| 4,4'-thio-bis-(6-tertiarybutyl-3-methylphenol) | 0.078 | 0.018 |
| Styrenated phenol | 0.064 | 0.017 |
| Hindered phenol, Antioxidant 431 (Trade Mark, Naugatuck Corp., U.S.A.) | 0.321 | 0.052 |
| Hindered phenol, Irganox 1010 (Trade Mark, Geigy Chemical Corp., Switzerland) | 0.214 | 0.021 |
| Hindered phenol, Irganox 1076 (Trade Mark, Geigy Chemical Corp., Switzerland) | 0.218 | 0.028 |
| 2. Amine-based antioxidants | | |
| Phenyl-α-naphthylamine | 0.896 | 0.058 |
| Phenyl-β-naphthylamine | 0.891 | 0.064 |
| N,N'-diphenyl-p-phenylenediamine | 0.893 | 0.019 |
| N,N'-di-β-naphthyl-p-phenylenediamine | 0.895 | 0.051 |
| N,N'-diallyl-p-phenylenediamine | 0.891 | 0.048 |
| N-isopropyl-N'-phenyl-p-phenylenediamine | 0.889 | 0.054 |
| Condensation product of diphenylamine and acetone | 0.796 | 0.017 |
| 6-ethoxy-2,2,4-trimethyl-1,2-dihydroquinoline | 0.892 | 0.189 |
| Condensation product of phenyl-β-naphthylamine and acetone | 0.714 | 0.020 |
| Mixture of phenyl-β-naphthylamine and N,N'-diphenyl-p-phenylenediamine | 0.313 | 0.021 |
| Mixture of phenyl-β-naphthylamine and N,N'-diallyl-p-phenylenediamine | 0.891 | 0.043 |
| 3. Triazine-based antioxidants | | |
| Irganox 565 (Trade Mark, Geigy Chemical Corp., Switzerland) | 0.896 | 0.020 |
| Irganox 858 (Trade Mark, Geigy Chemical Corp., Switzerland) | 0.714 | 0.019 |
| 4. Imidazole-based antioxidants | | |
| Zinc salt of 2-mercaptobenzoimidazole | 0.814 | 0.021 |
| 5. Thiodicarboxylic acid esters | | |
| Dilauryl-thiodipropionate | 0.624 | 0.046 |
| Distearyl-thiodipropionate | 0.513 | 0.019 |
| 6. Others | | |
| Reaction product of morpholinium-N-oxydiethylene-dithiocarbamate and dibenzothiazyl-disulfide | 0.728 | 0.018 |
| Reaction product of 1,1-bis-(4-hydroxyphenyl)-cyclohexane and organic amines | 0.698 | 0.017 |
| Tri-(nonylphenol)-phosphite | 0.314 | 0.063 |

What we claim is:

1. A heat-stable composition comprising a vinyl fluoride polymer containing at least 75 weight percent of vinyl fluoride, 0.01 to 5 weight percent of alkali metal formate, based on the weight of the vinyl fluoride polymer and 0.01 to 5 weight percent of an organic antioxidant having a boiling point of higher than the melting point of the vinyl fluoride polymer, based on the weight of the vinyl fluoride polymer: said organic antioxidant being selected from the group consisting of:

(1) a phenol-based antioxidant selected from the group consisting of 4,4'-dihydroxydiphenyl, dihydroxydiphenylmethane, hydroquinonemonobenzyl ether, 1,1-bis - (4 - hydroxyphenyl)-cyclohexane, 1-hydroxy-3-methyl-4-isopropyl benzene, 2,4,5-trihydroxybutyrophenone, 2,4-dimethyl-6-tertiarybutylphenol, 2,6-ditertiarybutylphenol, 2,5-ditertiaryamylhydroquinone, 2,5-ditertiarybutylhydroquinone, 2,6-ditertiarybutyl-p-cresol, 4-hydroxymethyl-2,6-ditertiarybutylphenol, 4,4' - bis-(2,6-ditertiarybutylphenol), 2,6-ditertiarybutyl - α-dimethylamino-p-cresol, 2,2'-methylene-bis-(4-methyl-6-tertiarybutylphenol), 2,2'-methylene-bis-(4 - ethyl-6-tertiarybutylphenol), 4,4'-methylene-bis-(2,6-tertiarybutyl-o-cresol), 4,4'-methylene-bis-(2,6-ditertiarybutylphenol), 1,3,5-trimethyl-2,4,6-tris-(3,5-ditertiarybutyl-4-hydroxybenzyl) benzene, 4,4' - butylidene-bis-(3 - methyl-6-tertiarybutylphenol), 4,4'-thio - bis - (6-tertiarybutyl-3-methylphenol), bis-(3-methyl - 4 - hydroxy - 5 - tertiarybutylbenzyl)sulfide, 4,4' - thio-bis-(6-tertiarybutyl-o-cresol), 4,4'-thio-bis-(3 - methyl-6-tertiarybutylphenol), 2,2'-thio-bis-(4-methyl-6-tertiarybutylphenol), thio-bis-(disecondary-amylphenol), 2,2'-dihydroxy-3,3'-di-(α-methylcyclohexyl)-5,5'-dimethyldiphenylmethane and styrenated phenol, (2) an amine-based antioxidant selected from the group consisting of phenyl-α-naphthylamine, phenyl-β-naphthylamine, N,N'-diphenyl-p-phenylenediamine, N,N' - di - β-naphthyl-p-phenylenediamine, N,N'-diallyl - p-phenylenediamine, N-isopropyl-N'-phenyl-p-phenylenediamine, 2,2,4 - trimethyl-1,2-dihydroquinoline polymer, 6-ethoxy-2,2,4-trimethyl-1,2-dihydroquinoline, condensation product of diphenyl amine and acetone, condensation product of phenyl-β-naphthylamine and acetone and aldol-α-naphthylamine, (3) a triazine-based antioxidant selected from the group consisting of 2,4-bis(n-octylthio)-6-(4-hydroxy-3,5-di-t-butyl-anilino)-1,3,5,-triazine and 4-n-octylthio-2,6 - bis(4 - hydroxy-3,5-di-t-butylanilino)-1,3,5-triazine, (4) an imidazole-based antioxidant selected from the group consisting of 2-mercaptobenzoimidazole and zinc salt of 2-mercaptobenzimidazole, (5) a thiodicarboxylic acid ester having the formula of $S(C_nH_{2n}COOR)_2$, wherein R is an alkyl or alkenyl of 6 to 20 carbon atoms and $n$ is an integer of 1 to 4, and (6) tri-(nonylphenyl)-phosphite antioxidant.

2. The heat-stable composition according to claim 1, in which said organic antioxidant is at least one phenol-based antioxidant selected from the group consisting of 4,4' - dihydroxydiphenyl, dihydroxydiphenylmethane, hydroquinonemonobenzyl ether, 1,1 - bis - (4 - hydroxyphenyl) - cyclohexane, 1 - hydroxyl - 3 - methyl - 4 - isopropyl benzene, 2,4,5 - trihydroxybutyrophenone, 2,4 - dimethyl - 6 - tertiarybutylphenol, 2,6 - ditertiarybutylphenol, 2,5 - ditertiaryamylhydroquinone, 2,5 - ditertiarybutylhydroquinone, 2,6 - ditertiarybutyl - p - cresol, 4-hydroxymethyl - 2,6 - ditertiary - butylphenol, 4,4' - bis-(2,6 - ditertiarybutylphenol), 2,6 - ditertiary - butyl - α-dimethylamino - p - cresol, 2,2' - methylene - bis - (4-methyl - 6 - tertiarybutylphenol), 2,2' - methylene - bis-(4 - ethyl - 6 - tertiary - butylphenol, 4,4' - methylene-bis-(6 - tertiarybutyl - o - cresol), 4,4' - methylene - bis-(2,6 - ditertiarybutylphenol), 1,3,5 - trimethyl - 2,4,6-tris - (3,5 - ditertiarylbutyl - 4 - hydroxybenzyl - benzene, 4,4' - butylidene - bis - (3 - methyl - 6 - tertiarylbutylphenol), 4,4' - thio - bis - (6 - tertiarybutyl - 3 - methylphenol), bis - (3 - methyl - 4 - hydroxy - 5 - tertiarybutylbenzyl) sulfide, 4,4' - thio - bis - (6 - tertiarybutyl - o-cresol), 4,4' - thio - bis - (3 - methyl - 6 - t - butylphenol), 2,2' - thio - bis - (4 - methyl - 6 - tertiarybutylphenol), thio - bis - (disecondary - amylphenol) - 2,2' - dihydroxy-3,3' - di - (α - methylcyclohexyl) - 5,5' - dimethyldiphenylmethane, and styrenated phenol.

3. The heat-stable composition according to claim 1, in which said organic antioxidant is at least one amine-based antioxidant selected from the group consisting of phenyl - α - naphthylamine, phenyl - β - naphthylamine, N,N' - diphenyl - p - phenylenediamine, N,N' - di - β-naphthyl - p - phenylenediamine, N,N' - diallyl - p - phenylenediamine, N - isopropyl - N' - phenyl - p - phenylenediamine, 2,2,4 - trimethyl - 1,2 - dihydroquinoline polymer, 6 - ethoxy - 2,2,4 - trimethyl - 1,2 - dihydroquinoline, condensation product of diphenyl amine and acetone, condensation product of phenyl - β - naphthylamine and acetone, and aldol-α-naphthylamine.

4. The heat-stable composition according to claim 1, in which said organic antioxidant is at least one triazine-based antioxidant selected from the group consisting of 2,4 - bis - (n - octylthio) - 6 - (4 - hydroxy - 3,5 - di - t-butyl - anilino) - 1,3,5 - triazine and 4 - n - octylthio - 2,6-bis(4-hydroxy-3,5-di-t-butyl-anilino)-1,3,5-triazine.

5. The heat-stable composition according to claim 1, in which said organic antioxidant is at least one imidazole-based antioxidant selected from the group consisting of 2-mercaptobenzoimidazole and zinc salt of 2-mercaptobenzoimidazole.

6. The heat-stable composition according to claim 1, in which said organic antioxidant is at least one thiodicarboxylic acid ester selected from the group consisting of distearyl thiodipropionate and dilauryl thiodipropionate.

7. The heat-stable composition according to claim 1, in which said alkali metal formate is one member of the group consisting of sodium formate, potassium formate and lithium formate.

8. The heat-stable composition according to claim 1, in which said organic antioxidant is contained in the range of 0.1 to 3 weight percent, based on the weight of the vinyl fluoride polymer.

9. The heat-stable composition according to claim 1, in which said alkali metal formate is contained in the range of 0.1 to 3 weight percent, based on the weight of the vinyl fluoride polymer.

References Cited

UNITED STATES PATENTS

| | | | |
|---|---|---|---|
| 3,442,853 | 5/1969 | Gobstein | 260—45.95 |
| 3,454,517 | 7/1969 | Neros et al. | 260—30.4 |

DONALD E. CZAJA, Primary Examiner

R. A. WHITE, Assistant Examiner

U.S. Cl. X.R.

260—45.7, 45.85, 45.9, 45.95